(12) United States Patent    (10) Patent No.:   US 12,620,610 B2

Kerkamm et al.        (45) Date of Patent:     May 5, 2026

(54) METHOD FOR OPERATING A FUEL CELL SYSTEM

(71) Applicant: Robert Bosch GmbH, Stuttgart (DE)

(72) Inventors: Ingo Kerkamm, Stuttgart (DE);
Sebastian Schmaderer, Stuttgart (DE);
Maxime Carre, Stuttgart (DE);
Sebastian Egger, Ehningen (DE)

(73) Assignee: Robert Bosch GmbH, Stuttgart (DE)

( * ) Notice: Subject to any disclaimer, the term of this patent is extended or adjusted under 35 U.S.C. 154(b) by 571 days.

(21) Appl. No.: 18/004,537

(22) PCT Filed: Jun. 15, 2021

(86) PCT No.: PCT/EP2021/066033

§ 371 (c)(1),
(2) Date: Jan. 6, 2023

(87) PCT Pub. No.: WO2022/008177

PCT Pub. Date: Jan. 13, 2022

(65) Prior Publication Data

US 2023/0253589 A1     Aug. 10, 2023

(30) Foreign Application Priority Data

Jul. 7, 2020    (DE) ..................... 10 2020 208 502.1

(51) Int. Cl.
   *H01M 8/04992*     (2016.01)
   *H01M 8/04298*     (2016.01)
   *H01M 8/04664*     (2016.01)

(52) U.S. Cl.
   CPC ... *H01M 8/04992* (2013.01); *H01M 8/04305* (2013.01); *H01M 8/04664* (2013.01)

(58) Field of Classification Search
   CPC .......... H01M 8/04223; H01M 8/04298–04992
   See application file for complete search history.

(56) References Cited

U.S. PATENT DOCUMENTS

| | | | |
|---|---|---|---|
| 2002/0051899 A1 | 5/2002 | Keskula et al. | |
| 2004/0005489 A1* | 1/2004 | Wakabayashi .... | H01M 8/04052 |
| | | | 429/429 |
| 2004/0137291 A1* | 7/2004 | Smedley ............. | H01M 6/5038 |
| | | | 429/432 |

(Continued)

FOREIGN PATENT DOCUMENTS

| | | |
|---|---|---|
| CA | 2970209 A1 | 12/2017 |
| WO | 2018111368 A1 | 6/2018 |

OTHER PUBLICATIONS

Cha, S (2016). Fuel cell Fundamentals. (3rd ed.) (pp. 272-294, 346, 431-449). (Year: 2016).*

(Continued)

*Primary Examiner* — Nicole M. Buie-Hatcher
*Assistant Examiner* — Jacob Buchanan
(74) *Attorney, Agent, or Firm* — Michael Best & Friedrich LLP

(57) ABSTRACT

The invention relates to a method for operating a fuel cell system, wherein the fuel cell system is controlled in accordance with a system-specific digital twin (14) that represents the fuel cell system. According to the invention, the digital twin (14) controls the fuel cell system in at least two different active operating states (16, 18) of the fuel cell system.

19 Claims, 3 Drawing Sheets

(56)     References Cited

U.S. PATENT DOCUMENTS

| | | | | |
|---|---|---|---|---|
| 2008/0166604 | A1* | 7/2008 | Weingaertner .... | H01M 8/04992 |
| | | | | 429/430 |
| 2008/0182139 | A1 | 7/2008 | Ganapathy et al. | |
| 2010/0248051 | A1* | 9/2010 | Shimoda ............. | H01M 8/0494 |
| | | | | 429/428 |
| 2012/0078437 | A1* | 3/2012 | Stripf .................. | H01M 10/633 |
| | | | | 700/300 |
| 2013/0316258 | A1* | 11/2013 | Tsukagoshi ....... | H01M 8/04992 |
| | | | | 429/423 |
| 2019/0018067 | A1* | 1/2019 | Kong ................... | G01R 31/367 |
| 2019/0173109 | A1* | 6/2019 | Wang ................ | H01M 8/04089 |
| 2019/0181464 | A1* | 6/2019 | Farnsworth ....... | H01M 8/04776 |
| 2024/0243311 | A1* | 7/2024 | Kemmer ........... | H01M 8/04156 |

OTHER PUBLICATIONS

Translation of International Search Report for Application No.
PCT/EP2021/066033 dated Oct. 10, 2021 (2 pages).

* cited by examiner

METHOD FOR OPERATING A FUEL CELL SYSTEM

BACKGROUND OF THE INVENTION

US 2019/0173109 A1 has already proposed a method for operating a fuel cell system in which the fuel cell system is checked as a function of a system-specific digital twin that maps the fuel cell system.

SUMMARY OF THE INVENTION

The invention proceeds from a method for operating a fuel cell system, wherein the fuel cell system is checked as a function of a system-specific digital twin that maps the fuel cell system.

It is proposed that the digital twin checks the fuel cell system in at least two different active operating states of the fuel cell system. The fuel cell system comprises at least one fuel cell unit for conversion of a fuel and/or for electrolysis of an electrolysis substance, in particular water. The fuel cell unit comprises at least one fuel cell, preferably a solid oxide fuel cell (SOFC) and/or a proton-exchange membrane fuel cell (PEMFC). Optionally, the fuel cell unit comprises a plurality of fuel cells arranged, for example, in a stack or a composite of stacks. The fuel cell system comprises at least one supply unit for handling operating fluids of the fuel cell system, in particular for supplying the fuel cell unit with the operating fluids and/or for further conducting operating fluids exiting the fuel cell unit. For example, operating fluids include the fuel, an oxygen-containing fluid, in particular ambient air, the electrolysis substance, a reaction product, in particular water and/or carbon dioxide, an electrolysis product, in particular hydrogen, and/or a reforming additive, in particular water vapor. Preferably, the fuel cell system comprises an electronic unit for tapping an electric cell voltage and/or an electric cell current from the fuel cell unit, and/or for supplying an electric cell voltage and/or an electric cell current to the fuel cell unit. Preferably, the fuel cell system comprises at least one sensor unit for sensing operating parameters of the fuel cell system. Examples of operating parameters monitored by the sensor unit include a temperature of the operating fluids, of the fuel cell unit and/or of the supply unit, a pressure of the operating fluids, a flow parameter, in particular a volumetric flow rate and/or a mass flow rate, of the operating fluids, the cell voltage and/or the cell current, an operating point of at least one operating fluid conveying unit, in particular of a compressor, of a ventilator and/or of a pump for conveying one of the operating fluids, and/or a chemical composition, in particular a carbon content, a hydrogen content, a combustion-air ratio or the like, of one of the operating fluids. The fuel cell system comprises a control unit or regulating unit. The control unit or regulating unit is in particular provided to set and/or maintain the fuel cell unit to a predetermined operating point of the fuel cell unit. The term "provided" is understood in particular to mean specially configured, specially programmed, specially designed, and/or specially equipped. An object being provided for a particular function is understood in particular to mean that the object fulfills and/or performs this particular function in at least one application state and/or operating state. In particular, the control unit or regulating unit controls or regulates the supply unit and/or the electronic unit to reach and/or maintain the operating point of the fuel cell unit. Preferably, the control unit or regulating unit utilizes the operating parameters sensed by the sensor unit to reach and/or maintain the operating point of the fuel cell unit. The term "control unit or regulating unit" is understood in particular to mean a unit comprising at least one control electronics. The term "control electronics" is understood in particular to mean a unit comprising a processor unit and comprising a memory unit as well as an operating program stored in the memory unit. Particularly preferably, the control unit or regulating unit is designed as a programmable logic controller (PLC).

The digital twin comprises a plurality of data sets comprising, for example, individual data, characteristic curves, calculation rules, mathematical models, correlations, or the like about the fuel cell system. The digital twin preferably comprises at least one data set that has been individually captured specifically for the fuel cell system. For example, the digital twin comprises at least one data set describing a material of the fuel cell system. For example, the digital twin comprises at least one data set describing a manufacture of the fuel cell system and/or data captured about the fuel cell system during manufacture. For example, the digital twin comprises at least one data set describing a design of the fuel cell system. For example, the digital twin comprises at least one data set describing a commissioning of the fuel cell system. For example, the digital twin comprises at least one data set describing a regular operating state of the fuel cell system. In at least one method step of the method, the digital twin evaluates the data sets with regard to a description and/or characterization of the operating state of the fuel cell system, in particular taking into account the operating parameters sensed by the sensor unit. In particular, the digital twin is provided to determine non-sensed operating parameters of the fuel cell system. Optionally, the digital twin is provided to estimate a behavior of the fuel cell system in advance, in particular in the case of a simulated change in one of the operating parameters. In particular, the digital twin is provided to determine suitable target values of the operating parameters in order to realize a predetermined behavior of the fuel cell system. The digital twin is implemented by means of at least one computing unit and at least one database of the fuel cell system. Particularly preferably, the computing unit and the database are embedded in the same digital environment. The term "computing unit" is understood in particular to mean a unit comprising an information input, an information processing, and an information output. Advantageously, the computing unit comprises at least one processor, a memory, input and output means, further electrical components, an operating program, regulating routines, control routines, and/or calculation routines. Preferably, the computing unit is decentralized and comprises in particular a plurality of physically spaced apart computing elements and/or a communication unit, in particular a wired and/or wireless, in particular radio, network adapters for data exchange with further computing units, in particular of the same digital environment. Particularly preferably, the computing unit is provided for a cloud-based implementation of the digital twin. Alternatively, the components of the computing unit are arranged on a common board and/or advantageously arranged in a common housing. An action of the digital twin, for example, checking, mapping, activating, controlling, or the like, is performed in particular by the computing unit. The data sets comprising the digital twin are stored in the memory of the computing unit and/or the database and/or are stored there and/or updated by the digital twin after a query from an external source and/or by the sensor unit. The term "the digital twin describes the fuel cell system" is understood in particular to mean that the digital twin describes at least the fuel cell unit, the supply unit, and/or the electronic unit. Optionally, the digital twin additionally comprises at least one data set describing signal paths between the computing unit, the supply unit actuators, the electronic unit actuators, the sensor unit, and/or the control unit or regulating unit. Optionally, the digital twin additionally comprises at least one data set describing a place of installation of the fuel cell system.

A check of the fuel cell system by the digital twin comprises at least passive monitoring of an operation of the fuel cell system, and preferably, in at least one method step of the method, active controlling of the fuel cell system by the digital twin, in particular by means of the control unit or regulating unit. Particularly preferably, for checking the fuel cell system, the digital twin transmits control signals or data signals to the control unit or regulating unit, which in turn controls the fuel cell system as a function of these signals. Preferably, the digital twin passively monitors the fuel cell system when the latter is in a regular operating state. Preferably, the digital twin controls the fuel cell system when the latter is in an irregular operating state. The term "regular operating state" is understood in particular to mean an active operating state, in which the operating parameters, in particular a power, can be kept constant within a tolerance range about a respective target value for the operating parameter. Irregular operating states include, by way of example, commissioning, starting up, shutting down, and/or a fault state of the fuel cell system. Commissioning the fuel cell system comprises, in particular, initial startup, setting, fine-tuning, and/or calibrating the fuel cell system. Preferably, the fuel cell system comprises exactly one digital twin. Alternatively, the fuel cell system comprises at least one further digital twin which is, in particular redundant to the digital twin, in particular as a backup system, for a mutual check and/or for comparison between a current, in particular aged, state and a historical, in particular new, state of the fuel cell system.

In particular, the digital twin permanently or intermittently checks the fuel cell system, preferably in the at least two different active operating states of the fuel cell system.

Through the embodiment of the method according to the invention, a single digital twin can map both irregular and regular operating states of the fuel cell system. A fuel cell system, in particular a control electronics, for carrying out the method may advantageously be kept simple. Furthermore, advantageously comprehensive data sets comprising the manufacture, commissioning, and runtime behavior may be created and used. This can achieve an advantageously stable operation, an advantageously low wear risk, an advantageously individual fine-tuning, an advantageously precise prediction of a service life and/or a probability of failure of individual components of the fuel cell system and/or of the entire system, an advantageously short commissioning time, and/or an advantageously fast response to a fault state of the fuel cell system.

It is furthermore proposed that the digital twin, in at least one method step, sets a computational effort to map the fuel cell system depending on the current active operating state of the fuel cell system. Preferably, the digital twin increases the effort to map the fuel cell system when the fuel cell system switches from a regular operating state to an irregular operating state. Preferably, the digital twin reduces the effort to map the fuel cell system when the fuel cell system switches from an irregular operating state to a regular operating state. In particular, the digital twin switches between a basic model, in particular a simple one, and at least one complex model. When setting the effort to map the fuel cell system, the digital twin, for example, sets a number of the considered data sets of the database, a maximum data processing time to be used, an increment, in particular a time increment, of an iteration method, and/or a precision of a calculation. In order to set the effort, the digital twin in particular activates or deactivates computational additional modules of the digital twin which extend the basic model to the complex model. In particular, the effort to map the system is given by the number of calculation rules executed by the computing unit per input data. For example, in comparison to the complex model, in the basic model, particular operating parameters are not determined or a calculation is replaced by an average, numerical methods are performed with fewer iterations or wider convergence criteria or are replaced by fewer system-specific functions, fewer elements in mathematical series, in particular polynomial regression functions, are evaluated, or the like. For example, in comparison to the basic model, in the complex model, additional operating parameters are determined or averages are replaced by calculations, numerical methods are performed with more iterations or narrower convergence criteria, non-system-specific functions are replaced by numerical methods, more elements in mathematical series, in particular polynomial regression functions, are evaluated, or the like.

A transition between the basic model and the complex model may be carried out in several individual steps or abruptly. For example, the digital twin increases the effort until the map it creates is in line with the operating parameters sensed by the sensor unit. For example, the digital twin reduces the effort as long as the map it creates is still in line with the operating parameters sensed by the sensor unit. Optionally, the digital twin considers different additional data sets as a function of the type of the irregular state. Alternatively, the digital twin switches between a minimum effort of the basic model and a maximum effort of the complex model without intermediate steps and/or without differentiation of the irregular operating states.

By the embodiment of the method according to the invention, an advantageously adaptive digital twin for a fuel cell system can be implemented. In particular, during regular operation, the digital twin can advantageously be operated in a resource-saving, in particular energy-saving manner. In particular, during irregular operation, the digital twin can advantageously produce precise predictions and/or control parameters for the control unit or regulating unit.

It is furthermore proposed that the digital twin supplies operating parameters to be set of the fuel cell system to a control unit or regulating unit, in particular the already mentioned control unit or regulating unit, of the fuel cell system during an irregular operating state, in particular the already mentioned irregular operating state, in particular during commissioning and/or a fault state, of the fuel cell system. In particular, in the irregular operating state, the digital twin checks the fuel cell system via the control unit or regulating unit. Preferably, in the irregular state, the operating parameters sensed with the sensor unit are transmitted to the digital twin, in particular only to the digital twin. In particular, the digital twin evaluates the sensed operating parameters before the control unit or regulating unit uses the sensed operating parameters to control or regulate the fuel cell system. The sensed operating parameters may be passed from the digital twin to the control unit or regulating unit or transmitted from the sensor unit to the control unit or regulating unit and released from the digital twin. The digital twin preferably provides the control unit or regulating unit in the irregular state with a target value, an adjustment of a current target value, and/or a tolerance deviation from the target value, in particular in order to transition the irregular operating state to the regular operating state. The digital twin may provide the operating parameters to be set either selectively as a single intervention in the control or regulation of the control unit or regulating unit, or continuously or at regular intervals in order to specify a sequence. The embodiment according to the invention can advantageously react quickly to a fault state of the fuel cell system. In particular, a commissioning period of the fuel cell system can advantageously be kept short.

Furthermore, it is proposed that the digital twin monitors the fuel cell system for anomalies in sensed operating parameters of the fuel cell system during a regular operating state, in particular the already mentioned regular operating state, of the fuel cell system. In the regular operating state, the operating parameters sensed with the sensor unit are transmitted directly to the control unit or regulating unit for controlling or regulating. In the regular operating state, the operating parameters sensed with the sensor unit are transmitted to the digital twin. In the regular operating state, the digital twin compares the sensed operating parameters with the basic model, with a profile of the sensed operating parameters logged by the digital twin, limit values stored in the database for the operating parameter, or the like, in order to detect an anomaly in the sensed operating parameters. An anomaly is in particular a value or profile of the sensed operating parameter that deviates from a planned behavior. In particular, an anomaly may manifest as a value offset, as a drift, as an oscillation, as a lack of dependence on another operating parameter, as a delayed change compared to a setting change by the control unit or regulating unit, or the like. Preferably, the digital twin does not intervene in the control or regulation of the control unit or regulating unit as long as it does not detect an anomaly. The embodiment according to the invention can advantageously detect a fault state of the fuel cell system early. In particular, an effort made by the digital twin can advantageously be kept low. In particular, the method may advantageously be kept simple, energy-efficient, and/or time-efficient.

Furthermore, it is proposed that, in at least one method step, the digital twin places a control unit or regulating unit of the fuel cell system into a fault diagnosis state upon detection of an anomaly in sensed operating parameters of the fuel cell system. In particular, the digital twin switches to the complex model upon detection of an anomaly. The fault diagnosis state is provided to identify the fault state of the fuel cell system that resulted in the anomaly. Preferably, the digital twin purposefully provides operating parameter changes for the fault diagnosis state in order to identify the fault state. Generally, an operating parameter change in the fault diagnosis state is not provided in order to return to the regular operating state. For fault diagnosis, the digital twin in particular provides, in at least one method step, operating parameters which are to be set and in which a regular operating state is not possible. Optionally, for fault diagnosis, the digital twin first provides operating parameters changes in which a regular operating state is possible. If the fault diagnosis reveals that the fault state can be corrected by an operating parameter adjustment, the digital twin can optionally cause a return to the regular operating state after the completed fault diagnosis. Alternatively or additionally, the digital twin outputs a result of the fault diagnosis, stores it in the database, and/or notifies a maintenance service. The embodiment according to the invention can advantageously reliably identify fault states of the fuel cell system.

Furthermore, it is proposed that, in at least one method step, the digital twin places a control unit or regulating unit of the fuel cell system into a fault compensation state upon detection of an anomaly in sensed operating parameters of the fuel cell system. In particular, in the fault compensation state, the digital twin changes a setting of the control unit or regulating unit in order to return to a stable operating state, in particular the regular operating state. For example, settings of the control unit or regulating unit include a limit value and/or a tolerance value for the operating parameter and/or a control parameter or regulating parameter, in particular a control sensitivity and/or a relationship of different control elements of the control unit or regulating unit relative to one another. Preferably, compared to the regular operating state, in the fault compensation state, the digital twin increases a range of values that can be set by the control unit or regulating unit for the operating parameter. If the fault compensation state does not result in a return to a stable operating state, in particular the regular operating state, the digital twin preferably triggers the fault diagnosis state. Optionally, upon successful fault compensation, the digital twin logs the operating parameter change that resulted in success, in particular for later reuse. The embodiment according to the invention can advantageously maintain a regular operation for a long time, in particular without operator intervention.

In addition, it is proposed that the digital twin, in at least one method step, in particular regularly, places a control unit or regulating unit, in particular the already mentioned control unit or regulating unit, of the fuel cell system into a test state. In particular, the control unit or regulating unit performs a defined change in the operating parameter in the test state, for example with a rectangular, triangular, sinusoidal value curve, or the like. The digital twin logs a response of the fuel cell system to the change. In particular, the digital twin analyzes the response in order to detect a hitherto unrecognized fault state, e.g., due to wear. Optionally, based on the response, the digital twin adjusts a target value of at least one operating parameter for a regular operating state. The embodiment according to the invention can detect and digitally log a current state of the fuel cell system. In particular, the digital twin can advantageously be adapted to the current state before the fuel cell system falls into a fault state.

Furthermore, it is proposed that the digital twin, in an irregular operating state of the fuel cell system, activates an additional control unit or regulating unit for controlling or regulating external components. The term "external components" is understood in particular to mean devices that are not permanently arranged on the fuel cell system and are, in particular, temporarily coupled to the fuel cell system for commissioning and/or maintenance. Examples of external components include a gas analysis device for analysis of the fuel or an exhaust produced by the fuel cell unit, an inert gas supply unit for flooding the fuel cell system with inert gas, an electric heater for controlling the temperature of the fuel cell system, in particular independently of a fuel utilization, a further sensor unit for sensing the operating parameters at additional measurement points, or the like. In particular, the additional control unit or regulating unit is provided to set the external components in accordance with a specification by the digital twin. Optionally by means of the additional control unit or regulating unit, the digital twin preferably requests operating parameters, sensed by the external components, from the external components in order to store them in the database. During commissioning, the digital twin in particular iteratively restricts and/or adjusts a range of values of the operating parameters to be set by the control unit or regulating unit and/or the additional control unit or regulating unit, as a function of the operating parameters sensed by the sensor unit or the external components, in particular until a regular operating state is reached at a predetermined operating point of the fuel cell unit. The embodiment according to the invention can advantageously keep a commissioning period short. For fault analysis or for stabilization of the regular operating state, the digital twin can in particular access advantageously extensive test data and setting data.

It is furthermore proposed that the digital twin retrieves data from at least one further fuel cell system in at least one method step. Preferably, the digital twin retrieves the data by means of the communication unit. For example, the digital twin retrieves the data from a central database, e.g., on an Internet server or a local private server. Alternatively, the digital twin retrieves the data directly from the further fuel cell system, in particular its digital twin. In particular, the digital twin retrieves historical operating data of the further fuel cell system in order to differentiate between a regular operating state, compensable anomalies of the operating parameters, and/or maintenance-requiring anomalies of the operating parameters. In particular, for compensable anomalies, the digital twin retrieves the operating parameter change made for successful compensation. The embodiment according to the invention can provide an advantageously large basis of data to the digital twin. In particular, the digital twin can process data from similar, in particular structurally identical, fuel cell systems and/or fuel cell systems comprising structurally identical components.

In addition, a fuel cell system comprising a computing unit, in particular the already mentioned computing unit, is proposed for carrying out a method according to the invention. The fuel cell system comprises the database. The fuel cell system comprises the fuel cell unit, the supply unit, the sensor unit, and the electronic unit. The fuel cell system comprises the control unit or regulating unit for controlling or regulating the supply unit, the sensor unit, and/or the electronic unit. The fuel cell system optionally comprises the additional control unit or regulating unit for controlling or regulating the external components. Particularly preferably, the control unit or regulating unit and the additional control unit or regulating unit are identical. In particular, the control unit or regulating unit and the additional control unit or regulating unit are realized by the same component of the fuel cell system, wherein the control unit or regulating unit and the additional control unit or regulating unit are implemented in particular as different operating states of this component, wherein a switch between these operating states is in particular controlled by the digital twin. Alternatively, the control unit or regulating unit and the additional control unit or regulating unit are realized by at least two, in particular separate, components. The fuel cell system comprises the communication unit for data exchange between the computing unit, the database, supply unit actuators, electronic unit actuators, the control unit or regulating unit, the additional control unit or regulating unit, the external components, and/or a local, regional, and/or global network. The embodiment according to the invention can provide an advantageously simple fuel cell system for implementing a digital twin, which can map both irregular and regular operating states of the fuel cell system.

The method according to the invention and/or the fuel cell system according to the invention is/are not intended to be limited to the above-described application and embodiment. In order to fulfill a functionality described herein, the method according to the invention and/or the fuel cell system according to the invention can in particular comprise a number of individual elements, components, units, and method steps that deviates from a number mentioned herein. Moreover, for the ranges of values specified in this disclosure, values within the mentioned limits are also to be considered disclosed and usable as desired.

BRIEF DESCRIPTION OF THE DRAWINGS

Further advantages become apparent from the following description of the drawings. The drawings show an exemplary embodiment of the invention. The drawing, the description, and the claims contain numerous features in combination. The person skilled in the art will expediently also consider the features individually and combine them into meaningful further combinations.

Shown are.

DETAILED DESCRIPTION

Figure 1:
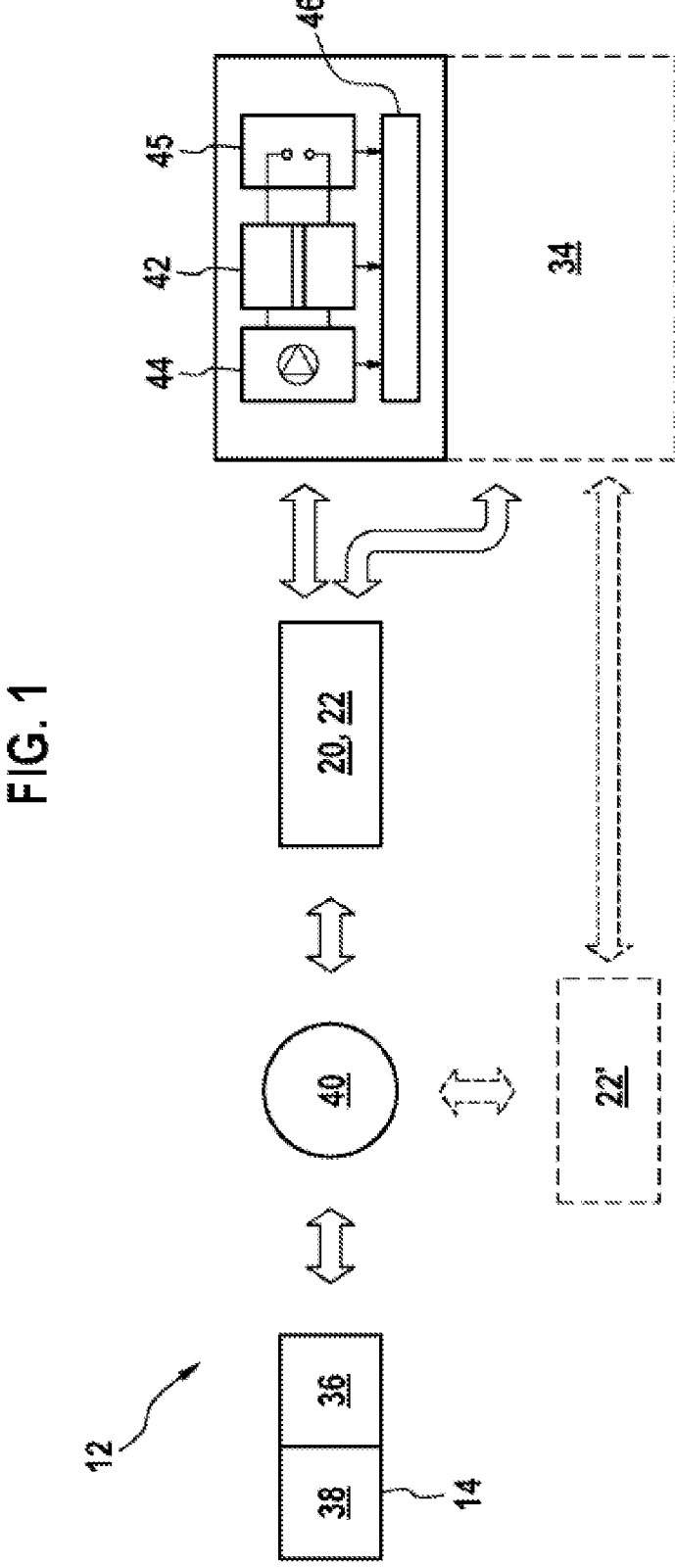
FIG. 1 a schematic illustration of a fuel cell system according to the invention, FIG. 2 a schematic flow chart of a method according to the present invention, and FIG. 3 a schematic illustration of an exemplary operating parameter profile in the course of the method according to the invention.
Figure 2:
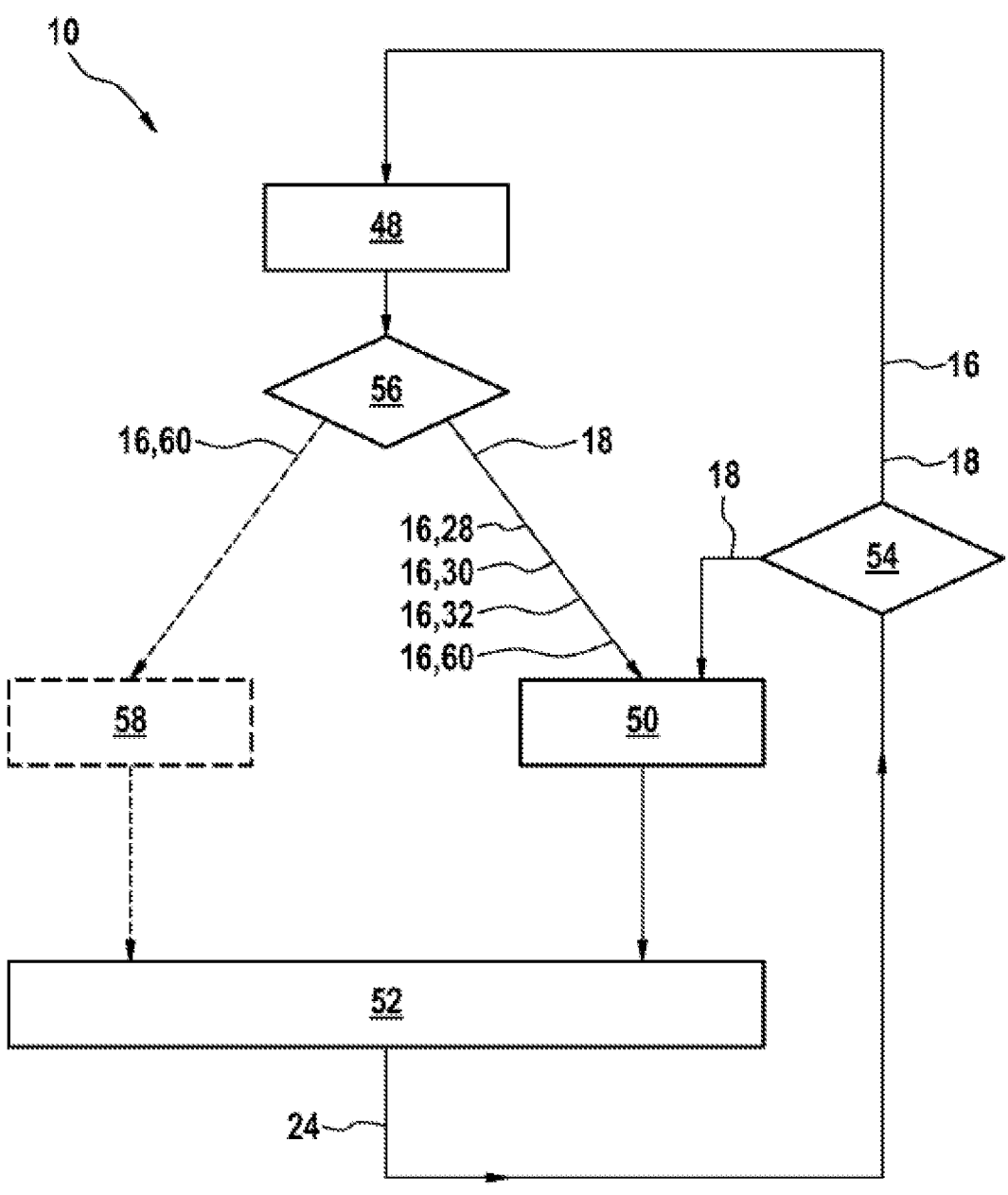

FIG. 1 shows a fuel cell system 12. The fuel cell system 12 comprises a computing unit 36 for carrying out a method 10, which is shown in FIG. 2. The fuel cell system 12 comprises at least one fuel cell unit 42. The fuel cell system 12 comprises at least one supply unit 44 for handling operating fluids of the fuel cell system 12. Preferably, the fuel cell system 12 comprises an electronic unit 45 for tapping an electric cell voltage and/or an electric cell current from the fuel cell unit 42, and/or for supplying an electric cell voltage and/or an electric cell current to the fuel cell unit 42. The fuel cell system 12 comprises at least one supply unit 46 for sensing operating parameters 24 (cf. FIGS. 2 and 3) of the fuel cell system 12. The fuel cell system 12 comprises a control unit or regulating unit 20. Optionally, the fuel cell system 12 comprises an additional control unit or regulating unit 22, 22' for controlling or regulating external components 34. Preferably, the control unit 20 is additionally designed as an additional control unit 22. Alternatively, the additional control unit 22' is designed as a component separate from the control unit 20. The fuel cell system 12 comprises a database 38, which is provided together with the computing unit 36 in order to implement a digital twin 14 of the fuel cell system 12. Preferably, the fuel cell system 12 comprises at least one communication unit 40 for data exchange between the digital twin 14, the control unit or regulating unit 20, the additional control unit or regulating unit 22, 22', the sensor unit 46, the external component 34, an actuator of the supply unit 44, e.g., a valve, a compressor motor, an electric heating element, or the like, and/or an actuator of the electronic unit 45, e.g., a transistor circuit, an adjustable resistor, a voltage source, or the like.

FIG. 2 shows the method 10. The method 10 is provided for operating the fuel cell system 12. The fuel cell system 12 is checked as a function of the system-specific digital twin 14. The digital twin 14 maps the fuel cell system 12 in a mapping step 48 of the method 10. The digital twin 14 checks the fuel cell system 12 in at least two different active operating states 16, 18 of the fuel cell system 12. In the mapping step 48, the digital twin 14 retrieves data from at least one further fuel cell system. In at least one method step, the digital twin 14 sets a computational effort to map the fuel cell system 12 depending on the current active operating state 16, 18 of the fuel cell system 12. In particular, in an operating state determination 54 of the method 10, digital twin 14 checks whether the fuel cell system 12 is in a regular operating state 18 or an irregular operating state 16. In the case of a regular operating state 18, the digital twin 14 uses a basic model that maps the fuel cell system 12. In the case of an irregular operating state 16, the digital twin 14 uses a complex model that maps the fuel cell system 12. Preferably, the basic model represents a simplification, in particular an approximation, of the complex model. In particular, in the mapping step 48, the digital twin 14 evaluates the basic model or the complex model with the sensed operating parameters 24 and/or compares the expected values determined with the basic model or the complex model for the operating parameters to the sensed operating parameters 24 In a control determination step 56, the digital twin 14 determines whether to drive the control unit or regulating unit 20 and/or to activate the additional control unit or regulating unit 22, 22'. In the irregular operating state 16 of the fuel cell system 12, the digital twin 14 activates the additional control unit or regulating unit 22, 22' for controlling or regulating the external components 34. During an irregular operating state 16 of the fuel cell system 12, the digital twin 14 supplies the control unit or regulating unit 20, and optionally the additional control unit or regulating unit 22, 22', of the fuel cell system 12 with operating parameters 24 of the fuel cell system 12 to be set. In particular, during commissioning 60 of the fuel cell system 12, the digital twin 14 supplies the control unit or regulating unit 20 and/or, if present, the additional control and regulating unit 22, 22' with operating parameters 24 to be set. During commissioning, the additional control unit or regulating unit 22, 22' optionally assumes the tasks of the control unit or regulating unit 20. In particular, during a fault state of the fuel cell system 12, the digital twin 14 supplies the control unit or regulating unit 20 with operating parameters 24 to be set.

In the regular operating state 18, the control unit or regulating unit 20 controls or regulates, in a control step or regulating step 50, the supply unit 44 and/or the electronic unit 45, in particular in order to reach and/or maintain a predetermined operating point of the fuel cell unit 42. Preferably, in a detection step 52 of the method 10, the control unit or regulating unit 20 utilizes the operating parameters 24 sensed by the sensor unit 46 and/or the external components 34 to reach and/or maintain the operating point of the fuel cell unit 42. In particular, in a further control step or regulating step 58, the additional control unit or regulating unit 22, 22' controls or regulates the external component 34 to reach and/or maintain the operating point of the fuel cell unit 42. During a regular operating state 18 of the fuel cell system 12, the digital twin 14 monitors the fuel cell system 12 for anomalies 26 (cf. FIG. 3) in the sensed operating parameters 24 of the fuel cell system 12.

In the control determination step 56, the digital twin 14 places the control unit or regulating unit 20 of the fuel cell system 12 into a fault compensation state 30 upon detection of an anomaly 26 in the sensed operating parameters 24 of the fuel cell system 12. In particular, in the fault compensation state 30, the digital twin 14 changes control parameters or regulating parameters of the control unit or regulating unit 20 in order to restore the regular operating state 18. In the control determination step 56, in particular after unsuccessful fault compensation, the digital twin 14 places the control unit or regulating unit 20 of the fuel cell system 12 into a fault diagnosis state 28 upon detection of an anomaly 26 in the sensed operating parameters 24 of the fuel cell system 12. In particular, in the regular fault diagnosis state 28 in the control step or regulating step 50, the control unit or regulating unit 20 controls or regulates the supply unit 44 and/or the electronic unit 45 in order to identify, in particular at least restrict, a possible source of the fault, in particular without taking into account the predetermined operating point of the fuel cell unit 42. In the control determination step 56, the digital twin 14, in particular regularly, places the control unit or regulating unit 20 of the fuel cell system 12 into a test state 32. In particular, in test state 32 in the control step or regulating step 50, the control unit or regulating unit 20 controls or regulates the supply unit 44 and/or the electronic unit 45 in order to induce a defined change in at least one of the operating parameters 24, in particular so that the digital twin 14 can analyze a response of the fuel cell system 12 to the change.

Figure 3:
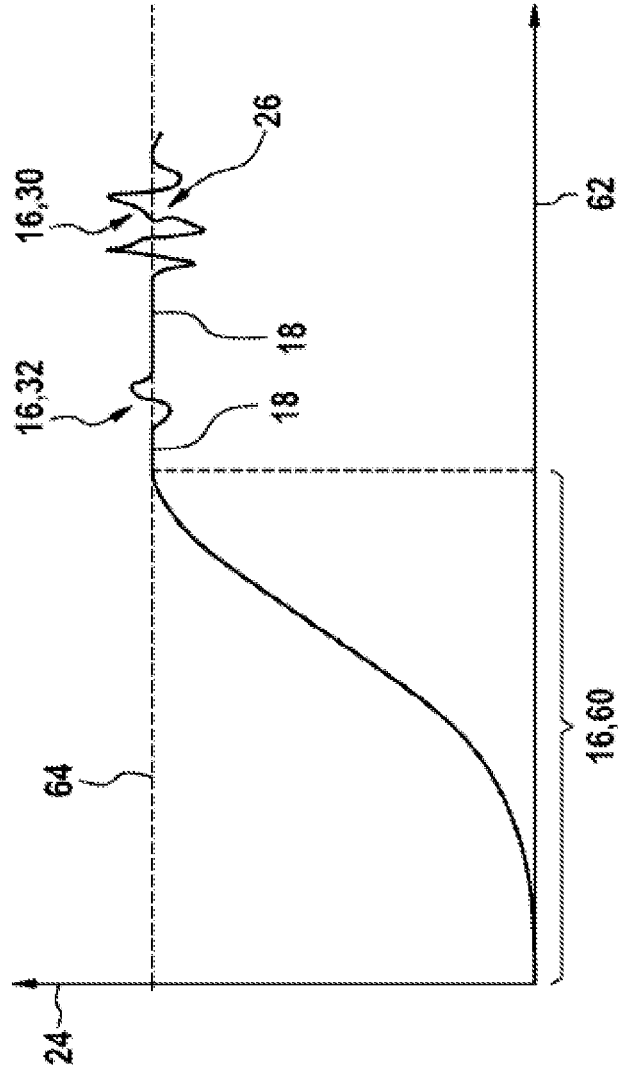

FIG. 3 shows a profile of the operating parameter 24, e.g., an electrical power generated by the fuel cell unit 42, as a function of the time 62. In particular, the control unit or regulating unit 20 is provided to bring the operating parameter 24 to a target value 64 and/or maintain it. In the test state 32, the digital twin 14 of the control unit or regulating unit 20 provides a defined change in the operating parameter 24 and analyzes a response of the fuel cell system 12 to the change, in particular in order to detect wear of fuel cell system 12 and/or necessary maintenance of fuel cell system 12. Upon detection of an anomaly 26 of operating parameter 24, the digital twin 14 changes the operating parameter limit values provided by the control unit or regulating unit 20 in order to give the control unit or regulating unit 20 more leeway to return the fuel cell system 12 to the regular operating state 18.

The invention claimed is:

1. A method for operating a fuel cell system, the method comprising:

providing, with a computing unit of the fuel cell system, a system-specific digital twin (14) that maps the fuel cell system, determining, with the digital twin (14), that the fuel cell system is in one of at least two different active operating states (16, 18) of the fuel cell system based on a sensed parameter sensed by a sensor of the fuel cell system, mapping, with the digital twin, the fuel cell system using a first model corresponding to a first active operating state, comparing, with the digital twin, a value from the first model to the sensed parameter, and providing, based on the comparison and with the digital twin, operating parameters to a control unit of the fuel cell system to control the fuel cell system, wherein the digital twin reduces a computational effort to map the fuel cell system when the fuel cell system switches from the first active operating state to a second active operating state by deactivating at least one computational module of the digital twin.

2. The method as claimed in claim 1, wherein the digital twin (14) sets a computational effort to map the fuel cell system depending on a current active operating state (16, 18) of the fuel cell system.

3. The method as claimed in claim 1, wherein the digital twin (14) supplies a control unit or regulating unit (20, 22, 22') of the fuel cell system with the operating parameters (24) to be set for the fuel cell system during an irregular operating state (16).

4. The method as claimed in claim 1, wherein the digital twin (14) monitors the fuel cell system for anomalies (26) in sensed operating parameters (24) of the fuel cell system during a regular operating state (18) of the fuel cell system.

5. The method as claimed in claim 1, wherein, the digital twin (14) places a control unit or regulating unit (20, 22, 22') of the fuel cell system into a fault diagnosis state (28) upon detection of an anomaly (26) in sensed operating parameters (24) of the fuel cell system.

6. The method as claimed in claim 1, wherein, the digital twin (14) places a control unit or regulating unit (20, 22, 22') of the fuel cell system into a fault compensation state (30) upon detection of an anomaly (26) in sensed operating parameters (24) of the fuel cell system.

7. The method as claimed in claim 1, wherein the digital twin (14) places a control unit or regulating unit (20, 22, 22') of the fuel cell system into a test state (32).

8. The method as claimed in claim 1, wherein, in an irregular operating state (16) of the fuel cell system, the digital twin (14) activates an additional control unit or regulating unit (22, 22') for controlling or regulating external components (34).

9. The method as claimed in claim 1, wherein the digital twin (14) retrieves data from at least one further fuel cell system.

10. The method of claim 1, wherein activating at least one computation module of the digital twin includes at least one of:

determining additional operating parameters, performing a numerical method with at least one of a first number of iterations and a first number of convergence criteria, replacing non-system specific functions with the numerical method, and evaluating a polynomial regression function.

11. The method of claim 1, wherein the first active operating state is an irregular operating state and the second active operating state is a regular operating state.

12. The method of claim 1, wherein the digital twin reduces a computational effort to map the fuel cell system when the fuel cell system switches from an irregular operating state to a regular operating state by:

evaluating a first number of data sets of the digital twin, setting a first data processing time for mapping the fuel cell system, and setting a first time increment of an iteration method.

13. The method of claim 12, wherein the digital twin increases the computational effort to map the fuel cell system when the fuel cell system switches from the regular operating state to the irregular operating state by:

evaluating a second number of data sets of the digital twin, wherein the second number of data sets is greater than the first number of data sets, setting a second data processing time for mapping the fuel cell system, wherein the second data processing time is less than the first data processing time, and setting a second time increment of the iteration method, wherein the second time increment is less than the first time increment.

14. The method of claim 1, wherein the digital twin provides the operating parameters to the control unit in response to sensing an anomaly based on the comparison of the value of the first model to the sensed parameter.

15. A fuel cell system comprising a computing unit (36) configured to:

obtain, with a computing unit of the fuel cell system, a system-specific digital twin (14) that maps the fuel cell system, determine, with the digital twin (14), that the fuel cell system is in a first active operating state of a plurality of active operating states, map, with the digital twin, the fuel cell system using a first model corresponding to the first active operating state, compare, with the digital twin, a value from the first model to a sensed parameter sensed by a sensor of the fuel cell system, and provide, with the digital twin, operating parameters to a control unit of the fuel cell system to control the fuel cell system, wherein the digital twin reduces a computational effort to map the fuel cell system when the fuel cell system switches from the first active operating state to a second active operating state by deactivating at least one computational module of the digital twin.

16. The fuel cell system of claim 15, wherein the digital twin detects an anomaly between the value and the sensed parameter based on the comparison of the value to the sensed parameter.

17. The fuel cell system of claim 15, wherein the first model is one of a basic model and a complex model.

18. The fuel cell system of claim 17, wherein the digital twin performs the mapping with the basic model by deactivating at least one computational module of the digital twin.

19. The fuel cell system of claim 17, wherein the digital twin performs mapping with the complex model by activating at least one computational module of the digital twin.

* * * * *